(12) United States Patent
White-Hauser

(10) Patent No.: US 6,643,367 B1
(45) Date of Patent: Nov. 4, 2003

(54) DYNAMIC AND SCHEDULED COMPUTER TELEPHONY RESOURCE ALLOCATION

(75) Inventor: Dale White-Hauser, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/301,855

(22) Filed: Apr. 29, 1999

(51) Int. Cl.[7] ............................................... H04M 3/00
(52) U.S. Cl. ............... 379/269; 379/88.13; 379/265.09; 379/908
(58) Field of Search ................................. 379/265, 266, 379/202, 203, 204, 205, 206, 88.12, 88.13, 269, 908; 370/431, 229, 437, 465, 468, 352, 353, 354, 355, 356

(56) References Cited

U.S. PATENT DOCUMENTS

| 4,959,854 | A | * | 9/1990 | Cave et al. ................. 379/157 |
| 5,231,649 | A | * | 7/1993 | Duncanson ................. 375/260 |
| 5,263,025 | A | * | 11/1993 | Torii et al. .................. 370/468 |
| 5,633,810 | A | * | 5/1997 | Mandal et al. .............. 395/114 |
| 5,638,363 | A | * | 6/1997 | Gittins et al. ............... 370/358 |
| 5,673,253 | A | * | 9/1997 | Shaffer ....................... 370/229 |
| 5,673,393 | A | * | 9/1997 | Marshall et al. ........ 395/200.04 |
| 5,751,712 | A | * | 5/1998 | Farwell et al. .............. 370/431 |
| 5,781,624 | A | * | 7/1998 | Mitra et al. ................. 379/244 |
| 5,805,599 | A | * | 9/1998 | Mishra et al. .............. 370/468 |
| 5,822,404 | A | * | 10/1998 | Cave ....................... 379/88.13 |
| 5,903,637 | A | * | 5/1999 | Hogan et al. ............... 379/203 |
| 5,974,134 | A | * | 10/1999 | Park ........................... 379/203 |
| 6,075,787 | A | * | 6/2000 | Bobeck et al. .............. 370/395 |
| 6,307,839 | B1 | * | 10/2001 | Gerszberg et al. .......... 370/235 |
| 6,363,079 | B1 | * | 3/2002 | Barzegar et al. ............ 370/465 |
| 6,373,860 | B1 | * | 4/2002 | O'Toole et al. ............. 370/493 |

* cited by examiner

Primary Examiner—Ahmad F. Matar
Assistant Examiner—Bing Bui
(74) Attorney, Agent, or Firm—Blakely, Sokoloff, Taylor & Zafman LLP

(57) ABSTRACT

A method to efficiently allocate telephony resources on a scheduled and dynamic basis, without requiring the shutting down and restarting of a telephony system, comprising the application of two algorithms, one to respond to dynamic changes in resource allocation and on to respond to scheduled resource allocation. The two algorithms work in conjunction with one another to determine the optimum configuration with which to allocate the system's resources, depending upon the estimated demand at a given time of day, and depending upon the actual demand at any given point in time. The method also makes provision for the modification and/or deactivation of the algorithms, and the manual allocation of resources, all by an operator.

19 Claims, 1 Drawing Sheet

DYNAMIC AND SCHEDULED COMPUTER TELEPHONY RESOURCE ALLOCATION

TECHNICAL FIELD

This invention relates to computer telephony, specifically a method to efficiently allocate telephony resources based upon extrinsic circumstances.

BACKGROUND OF THE INVENTION

Modern computer telephony systems are capable of processing large amounts of communications, either in the form of bandwidth broken down into specific, "virtual" communication channels or actual, separate communication channels. These channels comprise the resources of the system. Communication over these channels may be voice, facsimile, video, data or other formats. In order to process each form of communication, a computer telephony system must configure each specific channel to communicate using a specific format. A computer telephony system may be configured in any of a plurality of variations to allocate its resources such that the needs of a specific group of users are met. For example, a computer telephony system may have 800 channels in total, 400 channels configured for voice communications, 300 channels configured for video communications, 80 channels configured for facsimile communications and 20 channels configured for data communications. The problem with the configuration of computer telephony resources is that it is board dependant or static. The resources can only be configured upon the start up of the computer telephony system. The configuration remains static during the operation of the system. In order to reallocate the system resources to meet changing needs, the system must be shut down, restarted and manually reconfigured by the system operator.

For example, the above-referenced 800 channel system is set-up in a typical "daytime" configuration. That is, resources are more heavily allocated to voice and video than to facsimile and data because voice and video are people-intensive formats, i.e, people are at work during the day and use most of the telephony resources for voice telephone calls and video-conferencing. During evening and overnight periods, it is desirable to more heavily allocate resources to machine-intensive formats such as facsimile and data, i.e., during these time periods, most people are not at work, thus resources previously allocated to voice and video can be reallocated to facsimile and data formats, which do not require the presence of people. A typical "nighttime" configuration for an 800 channel system would be 100 channels configured for voice communications, 100 channels for video communication, 300 channels for facsimile communications and 300 channels for data communications. This reconfiguration requires two things, a system operator and a shut down of the system. The need for an operator presents the obvious problems of 1) insuring that she is present when reconfiguration is desired and 2) her compensation. Further, the shut down and restart of the system, no matter how brief, is unacceptable in this age of 24 hour per day business operations.

A related problem to the predictable or scheduled daytime/nighttime shift in need is the potential occurrence of unforseen shifts in need. For example, an emergency may occur during the middle of the day or a deadline may approach which prompts many people to work late. In either case, the utilization of voice resources approaches 100%. As it does this, the need to allocate more resources towards voice communications becomes great. Unless the system is reconfigured to reallocate resources from other communications to voice, capacity is reached and further voice communications cannot take place. Voice communications are either postponed or, in time-sensitive situations, permanently lost. This is intolerable. Further, the reallocation of resources, by requiring shutting down and restarting the system, temporarily requires decreasing all resources to zero. This too is an intolerable option, especially during exigent circumstances, because it completely cuts off all communications.

SUMMARY OF THE INVENTION

The above and other problems of the prior art are overcome in accordance with the present invention which relates to a technique to efficiently and automatically allocate telephony resources based upon dynamic and scheduled changes in the priority of communications and demand for resources.

First of all, this method replaces static, board assigned configuration control with an active, non-board based function. This removes the need for the shutting down and restarting of the system whenever the configuration is altered.

The method further comprises the application of at least two algorithms, one to respond to dynamic changes in resource allocation and another to respond to scheduled resource allocation. The two algorithms work in conjunction with one another to determine the optimum configuration with which to allocate the system's resources, depending upon the estimated demand at a given time of day, and depending upon the actual demand at any given point in time. The method also makes provision for the modification and/or deactivation of the algorithms, and the manual allocation of resources, all by an operator.

DETAILED DESCRIPTION OF THE PREFERRED EMBODIMENT

Figure 1:
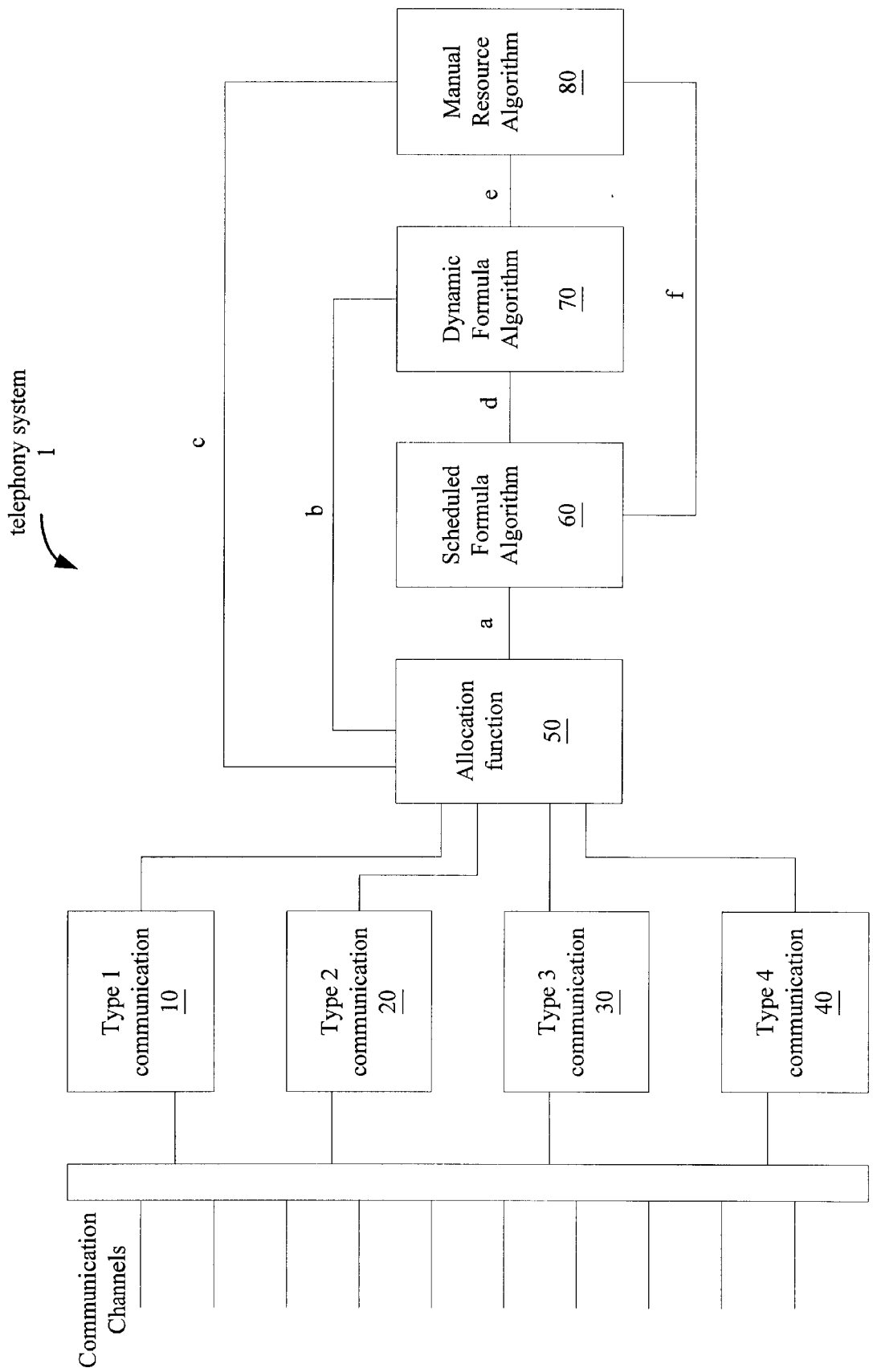
FIG. 1 shows a high-level block diagram of an exemplary system in accordance with the techniques of the present invention.

As shown in FIG. 1, telephony system 1 has communication resources, or channels, which are broken down into four types, voice or Type 1 communication 10, video or Type 2 communication 20, facsimile or Type 3 communication 30, and data or Type 4 communication 40. All available of system 1 resources are allocated, in some variation, to all four types of communication. Allocation function 50 of telephony system 1 is a non-board based control mechanism. Allocation function 50 is directly accessible by an operator and can be controlled by both dynamic and scheduled algorithms. Allocation function 50 is active and can effect running changes to telephony system 1 allocation of resources by the following exemplary control methods:

1. Scheduled Formula Algorithm 60:

where t=time and wN+xN+yN+zN=Total Number of Channels (resources), at t0, Type 1 resources equal w0, Type 2 resources equal x0, Type 3 resources equal y0, and Type 4 resources equal z0;

at t1, Type 1 resources equal w1, Type 2 resources equal x1, Type 3 resources equal y1, and Type 4 resources equal z1; and at t2, Type 1 resources equal w2, Type 2 resources equal x2, Type 3 resources equal y2, and Type 4 resources equal z2.

2. Dynamic Formula Algorithm 70:

At $w'''\%$ of utilization of Type 4 resources, Type 1 resources are decreased $x'''\%$, Type 2 resources are decreased by $y'''\%$ and Type 4 resources are decreased by $z'''\%$, and Type 4 resources are increased $x'''\%$ Type1+$y'''\%$Type2+$z'''\%$Type3, such that 100% of all resources are allocated.

at $w''\%$ of utilization of Type 3 resources, Type 1 resources are decreased $x''\%$, Type 2 resources are decreased by $y''\%$ and Type 4 resources are decreased by $z''\%$, and Type 3 resources are increased $x''\%$Type1+$y''\%$Type2+$z''\%$Type4, such that 100% of all resources are allocated; and at $w'''\%$ of utilization of Type 4 resources, Type 1 resources are decreased $x'''\%$, Type 2 resources are decreased by $y'''\%$ and Type 4 resources are decreased by $z'''\%$, and Type 3 resources are increased $x'''\%$Type1+$y'''\%$Type2+$z'''\%$Type3, such that 100% of all resources are allocated.

Manual Resource Allocation 80:

a. Operator modification of scheduled formula algorithm 60. The operator can vary the schedule of resource allocation and the amount of resources allocated to a specific communication type at any given point in time;

b. Operator modification of dynamic formula algorithm 70. The operator can vary threshold parameters at which resource reallocation will take place and the percentage of resources allocated to a specific communication type at any given threshold; and c. Direct operator input of how resources are allocated among communication types, regardless of algorithm-dictated allocation.

In the preferred embodiment, scheduled formula algorithm 60 is the default algorithm controlling allocation function 50. Under normal circumstances, channels are allocated among the communication types pursuant to the schedule of algorithm 60. In practice, unscheduled events will inevitably arise which will cause the need of a certain type of communication for resources to exceed the parameters of scheduled formula algorithm 60. Dynamic formula algorithm 70 analyzes the need for resources, exclusive of time. When a utilization threshold w % is exceeded, indicating that demand for channels by a specific communication type is nearly exceeding allocated capacity, dynamic formula algorithm 70 overrides scheduled formula algorithm 60 and configures system I resources to match the immediate need. In situations where a communication type is not being taxed in excess of w % thresholds, allocation function 50 will follow the scheduled formula algorithm 60 in anticipation of the load that will be put on system I during a specific period of time.

Algorithms 60 and 70 can be modified, deactivated or overridden via manual operator input 80. Scheduled formula algorithm 60 can be varied to change the schedule of resource allocation and the amount of resources allocated to a specific communication type at any given point in time. Dynamic formula algorithm 70 can be varied to change w % thresholds at which resource reallocation will take place and the percentage of resources allocated to a specific communication type. Manual operator input 80 may also be used to set static resource allocation, giving each communication type a fixed number of channels dictated by an operator who feels that the best allocation of resources cannot be achieved by using either algorithm but can be achieved through human input.

The above describes the preferred embodiment of the invention. Dynamic formula algorithm 70 is simplified for exemplary purposes. In practice, dynamic formula algorithm 70 can involve additional steps to further prioritize communication types in relation to each other, such that when more than one communication type exceeds the algorithm threshold, the algorithm determines an optimum allocation to remedy any conflict between the communication types. It is understood that various modifications or additions will be apparent to those of skill in the art. Such additions are intended to be covered by the claims appended hereto.

What is claimed:

1. A method of allocating telephony resources in a computer telephony system comprising:

providing a scheduled algorithm as a default algorithm for allocating said resources among a plurality of communications formats on a time basis and a dynamic algorithm as a secondary algorithm for allocating said resources among said communications formats on a demand basis;

selecting between said scheduled algorithm and said dynamic algorithm during operation of said system; and in response to said selecting, reallocating all available telephony resources proportionally among said communications formats by running said selected algorithm.

2. The method of claim 1, wherein said communications formats comprise voice call, video call, facsimile and data transmission.

3. The method of claim 1, wherein reallocating said telephony resources among said communications formats comprises automatically configuring resources reallocated from one communications format to another communications format.

4. The method of claim 1, wherein selecting between said scheduled algorithm and said dynamic algorithm comprises automatically selecting between said scheduled algorithm and said dynamic algorithm based on a predetermined schedule.

5. The method of claim 1, wherein selecting between said scheduled algorithm and said dynamic algorithm comprises manually selecting between said scheduled algorithm and said dynamic algorithm.

6. The method of claim 1, further comprising predetermining a threshold parameter for each of said communications formats.

7. The method of claim 6, wherein selecting between said scheduled algorithm and said dynamic algorithm comprises automatically selecting said dynamic formula algorithm when said predetermined threshold parameter for one of said communications formats is exceeded.

8. The method of claim 1, wherein a priority scheme in a communications format is utilized in said dynamic formula algorithm in reallocating available resources.

9. The method of claim 1, wherein said threshold parameters are changeable while said telephony system is in operation.

10. A method comprising:

allocating telephony resources among a plurality of communication types in a computer telephony system on a time basis using a scheduled algorithm;

monitoring the usage of the telephony resources for each communication type;

selecting between the scheduled algorithm and a dynamic algorithm based on actual demand of each communication type; and reallocating the telephony resources among the plurality of communication types based on the selected algorithm.

11. The method of claim 10, wherein the plurality of communication types comprise voice call, video call, facsimile, and data communications.

12. The method of claim 10, wherein reallocating the telephony resources comprises automatically configuring the telephony resources reallocated from one communication type to another communication type.

13. The method of claim 10, wherein reallocating the telephony resources based on actual demand of each communication type using a dynamic algorithm comprises reallocating the telephony resources when demand of one of the communication types exceeds its scheduled allocation.

14. The method of claim 10, wherein allocating telephony resources among a plurality of communication types on a time basis using a scheduled algorithm comprises allocating telephony resources among a plurality of communication types using a scheduled algorithm based on estimated demand of each communication type at different times in a day.

15. A telephony system comprising:
   an assigner to allocate telephony resources between a plurality of communication types in the telephony system on a time basis using a scheduled algorithm;
   a monitor coupled to the assigner to determine the actual usage of the telephony resources for each communication type;
   a selector to choose between the scheduled algorithm and a dynamic algorithm based on actual demand of each communication type; and
   a reassigner coupled to the monitor to reallocate the telephony resources between the plurality of communication types based on the selected algorithm.

16. The telephony system of claim 15, wherein the assigner comprises the reassigner.

17. The telephony system of claim 15, wherein the plurality of communication types comprise voice call, video call, facsimile, and data communication.

18. The telephony system of claim 15, wherein the assigner to allocate telephony resources between a plurality of communication types on a time basis using a scheduled algorithm comprises the assigner to allocate telephony resources among a plurality of communication types using a scheduled algorithm based on estimated demand of each communication type at different times in a day.

19. The telephony system of claim 15, wherein the reassigner to reallocate the telephony resources based on actual demand of each communication type using a dynamic algorithm comprises the reassigner to reallocate the telephony resources when actual demand of one of the communication types exceeds its scheduled allocation.

* * * * *

UNITED STATES PATENT AND TRADEMARK OFFICE
CERTIFICATE OF CORRECTION

PATENT NO.    : 6,643,367 B1
DATED         : November 4, 2003
INVENTOR(S)   : White-Hauser It is certified that error appears in the above-identified patent and that said Letters Patent is hereby corrected as shown below:

Column 3,
From lines 2 to 7, delete "At w'''% of utilization of Type 4 resources, Type 1 resources, are decreased x'''%, Type 2 resources are decreased by y'''% and Type 4 resources are decreased by z'''%, and Type 4 resources are increased x'''% Type1+y'''%Type2+z'''% Type3, such that 100% of all resources are allocated.", insert -- at w% of utilization of Type 1 resources, Type 2 resources are decreased x%, Type 3 resources are decreased by y% and Type 4 resources are decreased by z%, and Type 1 resources are increased x%Type2 + y%Type3 + z%Type4, such that 100% of all resources are allocated; at w`% of utilization of Type 2 resources, Type 1 resources are decreased x`%, Type 3 resources are decreased by y`% and Type 4 resources are decreased by z`%, and Type 2 resources are increased x`%Type1 + y`%Type3 + z`%Type4, such that 100% of all re-sources are allocated; --.
Line 17, delete "Type 3", insert -- Type 4 --.

Signed and Sealed this

Twenty-seventh Day of April, 2004

JON W. DUDAS
*Acting Director of the United States Patent and Trademark Office*